United States Patent [19]

Bellmer

[11] Patent Number: 4,728,279
[45] Date of Patent: Mar. 1, 1988

[54] EXTRUSION HEAD INCLUDING A SEALING MECHANISM FOR A FILTER CHANGING DEVICE

[75] Inventor: Klaus Bellmer, Ronnenberg, Fed. Rep. of Germany

[73] Assignee: Hermann Berstorff Maschinenbau GmbH, Hannover, Fed. Rep. of Germany

[21] Appl. No.: 911,666

[22] Filed: Sep. 25, 1986

[30] Foreign Application Priority Data

Oct. 3, 1985 [DE] Fed. Rep. of Germany ....... 3535269

[51] Int. Cl.$^4$ ............................................. B29C 47/68
[52] U.S. Cl. ..................................... 425/185; 210/234;
210/236; 425/188; 425/192 R; 425/197;
425/376 R
[58] Field of Search ................... 425/185, 188, 192 R,
425/208, 197–199, 376 R, 376 A, 376 B;
210/234, 236

[56] References Cited

U.S. PATENT DOCUMENTS

| 3,284,848 | 11/1966 | Rice | 425/197 X |
|---|---|---|---|
| 3,653,419 | 4/1972 | Schutter | 425/199 X |
| 3,833,247 | 9/1974 | Puskas | 425/197 X |
| 3,902,835 | 9/1975 | Theysohn | 425/192 R X |
| 4,265,756 | 5/1981 | Schiesser | 425/197 X |
| 4,318,677 | 3/1982 | Ullrich et al. | 425/197 X |
| 4,358,262 | 11/1982 | Herbert | 210/236 X |
| 4,416,605 | 11/1983 | Konno et al. | 425/199 X |
| 4,473,346 | 9/1984 | Hehl | 425/185 X |
| 4,548,568 | 10/1985 | Herbert et al. | 425/185 X |
| 4,619,599 | 10/1986 | Herbert et al. | 425/192 R X |
| 4,642,039 | 2/1987 | Anders | 425/188 X |

FOREIGN PATENT DOCUMENTS

| 548727 | 11/1957 | Canada | 425/188 |
|---|---|---|---|
| 1919269 | 5/1971 | Fed. Rep. of Germany . | |
| 2201631 | 8/1973 | Fed. Rep. of Germany | 425/188 |
| 135595 | 5/1979 | German Democratic Rep. | 425/197 |

Primary Examiner—Richard L. Chiesa
Attorney, Agent, or Firm—Schwartz, Jeffery, Schwaab, Mack, Blumenthal & Evans

[57] ABSTRACT

An extrusion head comprising at least one fixed head portion and at least one displaceable head portion pivotable into and out of an operative position includes means for filtering material being extruded and means for effecting change-over of the filter. The means for effecting the change-over includes at least two perforated plates displaceable on guide means in a direction generally at right angles to that of the extruded material. The at least one pivotable head portion includes a pressure surface which, in the operative position, abuts against the perforated plates thereby retaining the plates in position and sealing them against leakage of the extruded material.

7 Claims, 5 Drawing Figures

EXTRUSION HEAD INCLUDING A SEALING MECHANISM FOR A FILTER CHANGING DEVICE

The present invention relates to a sealing mechanism for a filter changing device in an extrusion head. More particularly, the sealing mechanism of the present invention is intended for use in an extrusion head of the type which comprises a stationary or fixed portion and at least one pivotable portion movable towards and away from the fixed portion and with a filter changing device of the type which comprises at least two perforated plates displaceable in guide means in a direction which is substantially at right angles to the direction of flow of the material through the extrusion head.

BACKGROUND OF THE INVENTION AND PRIOR ART DISCUSSION

A sealing apparatus for a filter changing device is disclosed in German Patent Specification No. 1 919 269. In such arrangement, a pressure ring, which is acted upon by hydraulic piston and cylinder arrangements, is moved towards the displaceable slide member in order to effect sealing thereof in opposition to the pressure exerted by the extruded material.

In the event of a changeover of the filters disposed in the slide member, the hydraulic cylinders are initially relieved of pressure. The slide member can then be hydraulically displaced, into the changeover position, at right angles to the flow direction of the material. Simultaneously, the second filter disposed in the slide member is displaced into the path of the material in the flow channel. Accordingly a new, clean filter can be disposed in the material flow channel within a very short period of time.

The frequency with which the filter needs to be changed depends upon the degree of pollution in the extruded material. Each time that the filter is changed, the pressure must be removed from that filter slide member and, after the filter change, a fresh build-up of pressure must be achieved.

The hydraulic cylinders which are used for producing the pressure build-up are interconnected by means of a ring conduit or circuit. This circuit utilises a large number of component parts and, in addition, occupies a large volume around the extrusion head. If one portion of the extrusion head is upwardly pivotable, this spatial requirement for the ring conduit is, generally, not available.

OBJECTS OF THE INVENTION

The invention seeks to provide a sealing mechanism for a filter changing device in an extrusion head which includes an upwardly pivotable portion which occupies a minimal volume. Furthermore, the invention seeks to provide a sealing mechanism which is economical to manufacture and necessitates minimal assembly work.

SUMMARY OF THE INVENTION

In accordance with the present invention, there is provided a sealing mechanism for a filter changing device in an extrusion head, the filter changing device including at least two perforated plates displaceable in guide means in a direction generally at right angles to the direction of flow of material through the head, the extrusion head comprising at least one fixed portion and at least one displaceable portion which is pivotable towards and away from the fixed portion into, respectively, an operative and an inoperative position wherein the pivotable portion includes a pressure surface which, in the operative position, abuts against the perforated plates and applies a pressure thereto.

Preferably, hydraulic piston and cylinder arrangements are provided for effecting the pivotal movement of the displaceable head portion, the hydraulic piston and cylinder arrangements being additionally utilised to press the pressure surface against the perforated plates.

By providing a pressure surface on the pivotable head portion, the hydraulic pressure of the piston and cylinder arrangements used for effecting the pivotal movement can also be utilised for sealing the perforated plates. The sealing of the perforated plates, that is to say, the elimination of the play of the perforated plates in the guide means is ensured by the pressure of the pressure surface of the pivotable head portion against the slide member.

When a filter needs to be changed, the pressure is relieved by slightly reducing the pressure of the hydraulic piston and cylinder arrangements used for effecting the pivotal movement of the head portion or portions. However, the pivotal head portions themselves are not pivoted, so that the pressure surface provided on the pivotable head portion still abuts against the perforated plates but with a reduced pressure. A reduction in the pressure with which the perforated plates abut the guide means therefor is necessary if displacement of the plates is to be effected. The perforated plates can now execute a movement in a direction generally at right angles to the direction of flow of the material being extruded without permitting an excessive amount of the material to escape.

The displacement movement causes a cleaned or new fine-mesh filter to be conducted into the path of the material being extruded and moves the previously used filter out of the flow path. Accordingly, the changeover of the filter can be effected very rapidly. Once the displacement movement has been executed, the hydraulic piston and cylinder arrangement is subjected to a high pressure whereby the required sealing pressure between the perforated plate and the sealing elements is produced once more. The filter changing device is thus re-sealed against the pressure of the material, which may be as high as 500 bars.

The hydraulic piston and cylinder arrangement, which must be present for effecting the pivotal movement of the relevant head portions is thus additionally used in an extremely advantageous manner for sealing the perforated plates in their guide means.

Due to the high pressures involved, the perforated plates are pressed extremely strongly against the guide means disposed on the side of the filters remote from the pressure surface on the pivotable head portion. The pressure which is applied to the perforated plates is transmitted to the side of the perforated plates facing the extrusion device and provides sealing on such side. Accordingly, the material being extruded, which is often a thermoplastics material, is prevented from entering into the guide means for the perforated plates. Such entry would, of course, cause the ease of movement of the perforated plates to be considerably impaired.

Alternatively, the pressure for the pressure surfaces for sealing the perforated plates may be built-up in an advantageous and simple manner by providing hydraulically actuated wedge-shaped members which engage in correspondingly conically extending or tapering recesses formed, respectively, in lateral side wall portions of the head, the engagement of the wedge-shaped members in the recesses simultaneously locking the pivotable head portion or portions against the pressure of the material being extruded. These locking means are also normally present and are used for locking the pivotable head portions in their desired positions.

Such a wedge-shaped locking means can seal the head itself against the material pressures which may be as high as 500 bars.

Desirably, a sealing ring is disposed between the pressure surface and the perforated plates, which sealing ring surrounds the flow channel for the material being extruded.

BRIEF DESCRIPTION OF THE DRAWINGS

Various embodiments of a sealing mechanism in accordance with the present invention will be further described, by way of example, with reference to the accompanying drawings, in which.

DESCRIPTION OF PREFERRED EMBODIMENT

Figure 1:
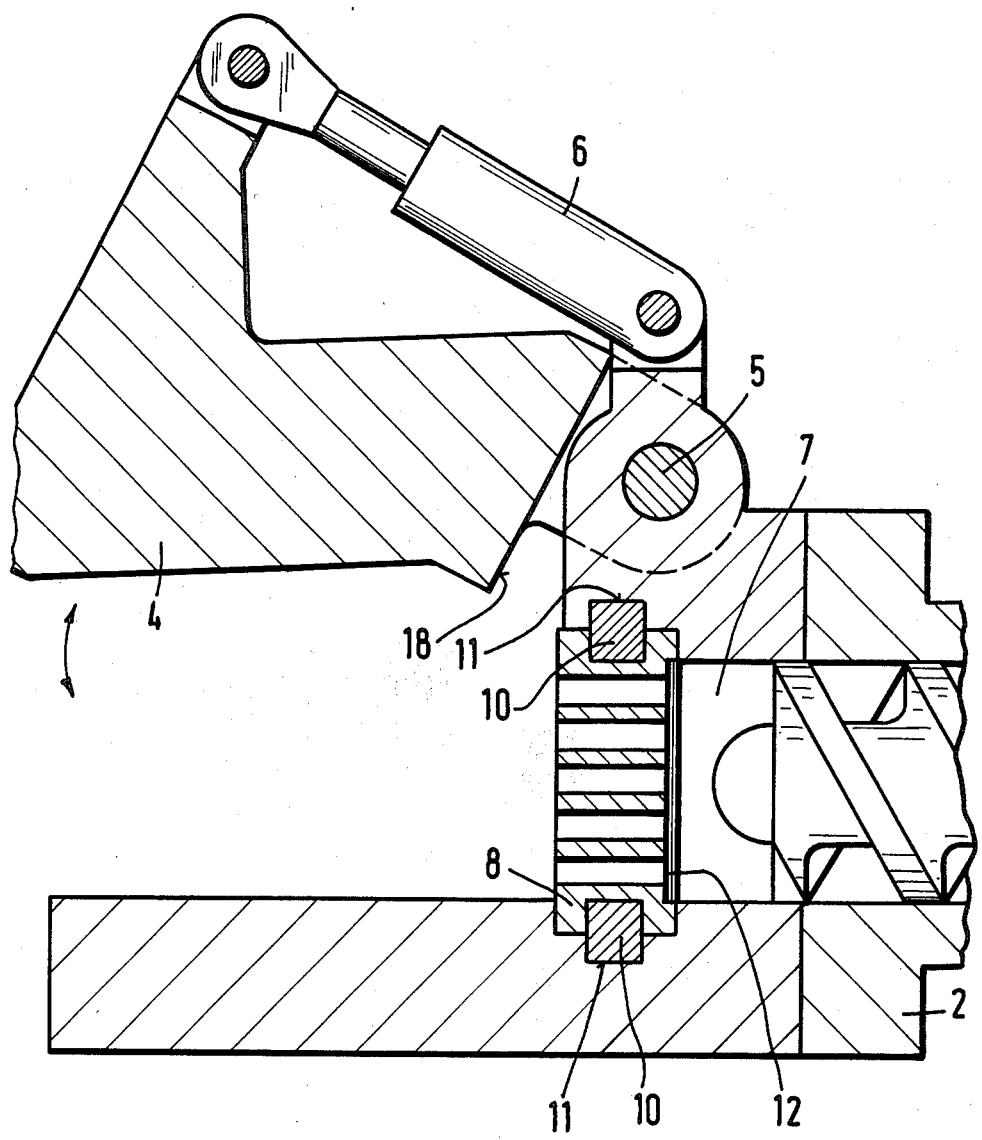
FIG. 1 is a longitudinal sectional view through a part of an extrusion head which includes an upwardly pivotable head portion and shows a filter changing device.

In the drawings, particularly in FIG. 1, there is shown an extrusion head 1 flange-mounted on an extrusion device 2. The head 1 comprises a fixed or stationary lower portion 3 and an upper portion 4 which is pivotable about a pivot axis 5 with respect to the portion 3. The upper portion 4 of the head is raised by actuating an hydraulic piston and cylinder arrangement 6.

The extrusion device 2 includes a flow channel 7 which has perforated filter plates 8 disposed at the downstream end thereof. In the embodiment shown in FIG. 1, the plates 8 are displaceable on guide rails 10 which are connected to the head and are mounted in grooves 11. Each of the displaceable perforated plates 8 has means for accommodating a fine-mesh filter device 12 on the surface facing the extrusion device 2.

Figure 2:
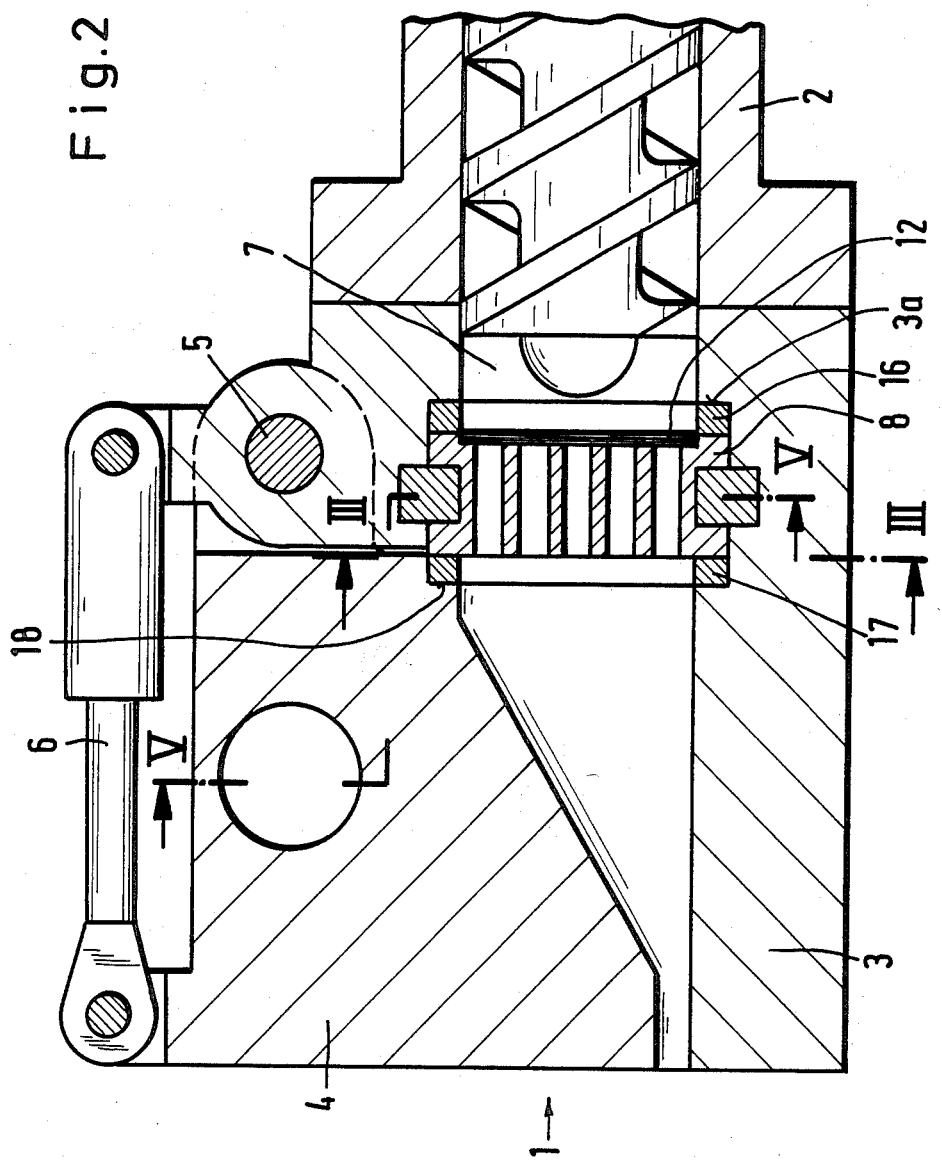
FIG. 2 shows a view similar to FIG. 1 of a modified embodiment with the extrusion head in its closed position and shows the sealing mechanism in operation.
Figure 3:
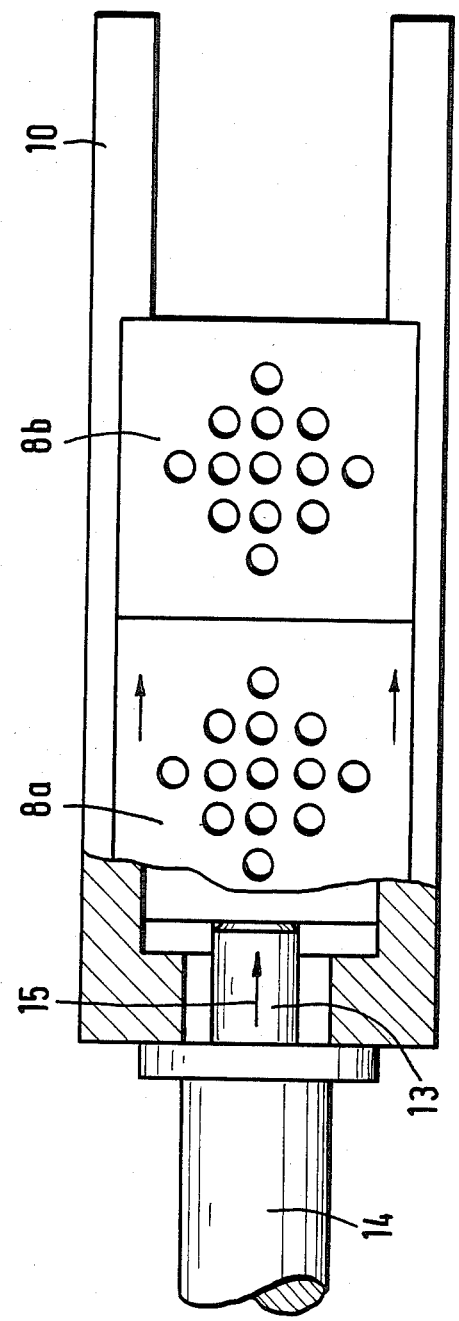
FIG. 3 is a more detailed view of the perforated plates forming part of the arrangement shown in FIG. 2, the view being taken along the line III—III of FIG. 2.

The guide means 10 are shown in greater detail in FIG. 3. These means accommodate two perforated plates 8a and 8b, plate 8a being shown in its inoperative or stand-by position, and plate 8b in its working position. As shown in FIGS. 1 and 2, replaceable fine-mesh filter packs 12 are disposed on the perforated plates 8a and 8b, but these have been omitted for the sake of clarity in FIG. 3.

The plates 8 are displaced by a piston rod 13 of a hydraulic piston and cylinder arrangement 14. The rod 13 moves towards perforated plate 8a in the direction of arrow 15 so as to permit the changeover operation to take place.

In the embodiment shown in FIG. 2, a sealing ring 16 is disposed in front of, when viewed in the direction of flow of the material, the perforated plate 8 and a further sealing ring 17 is disposed behind the plate 8. The sealing rings are easy to replace if they are slightly damaged by the high pressure loading thereof caused by the pressure of the surface 18 of the head portion 4 acting thereon. Without the sealing rings 16 and 17, which absorb any deformations occurring as a result of the sealing force, it would be necessary for the perforated plates and/or the portion of the head to be re-worked or re-machined. This operation would, of course, be substantially more expensive then merely replacing the sealing rings.

Figure 5:
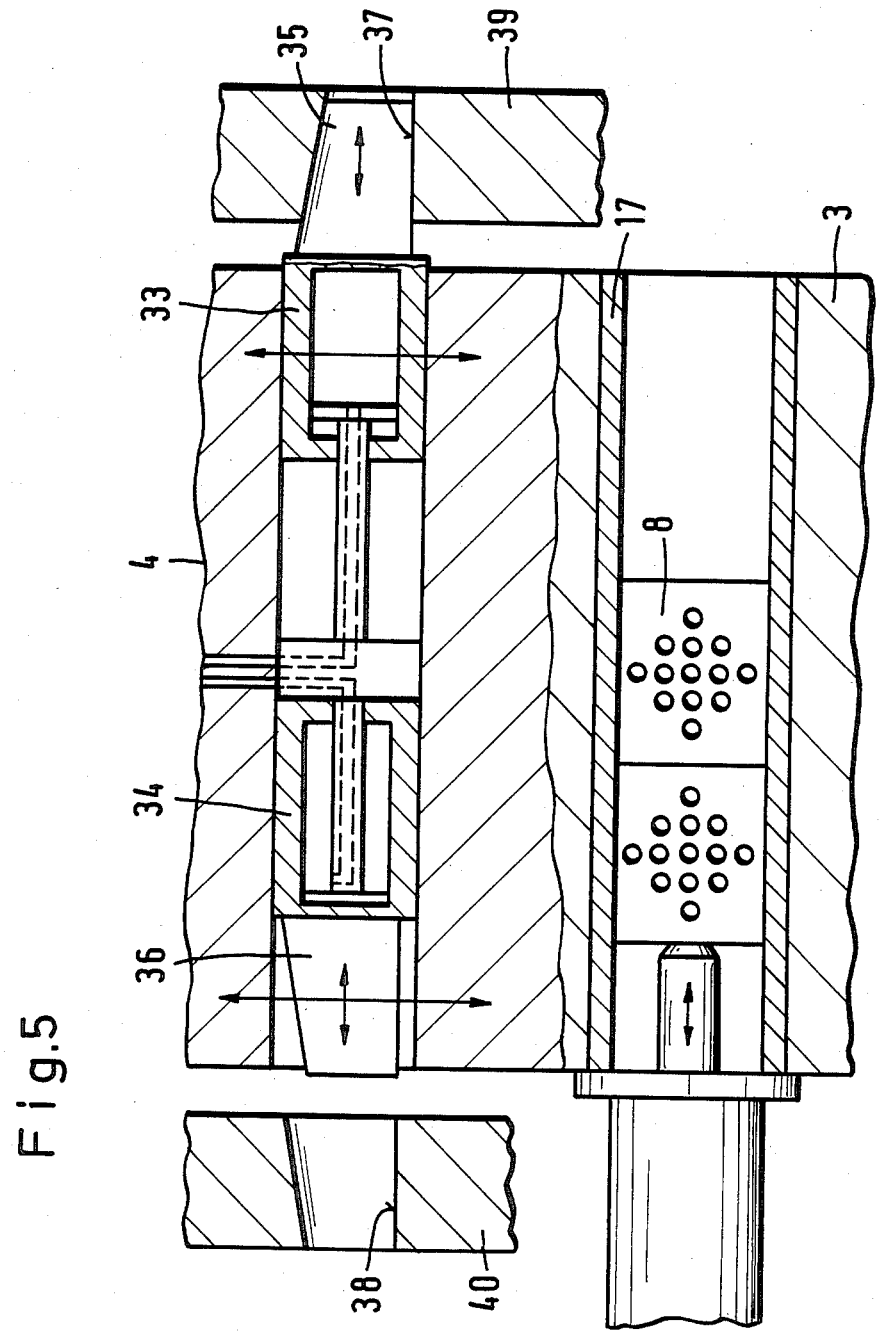
FIG. 5 is a cross-sectional view through an extrusion head taken along the line V—V of FIG. 2.

The cross-sectional view of FIG. 5, which is taken along the line V—V (FIG. 2), shows an alternative possibility of exerting pressure upon the pressure surfaces 18 which press against the perforated plates 8, the extrusion head locking means being used therefor in such an arrangement. This will be described in greater detail hereinafter.

Initially, the upper portion 4 of the extrusion head is lowered into its operative position by means of the hydraulic piston and cylinder arrangement 6, as is shown in FIG. 2. In order to increase further the closing force which must counteract a material pressure as high as 500 bars, the locking means shown in FIG. 5 are used.

The locking means shown in FIG. 5 comprises hydraulic piston and cylinder arrangements 33 and 34 which are disposed preferably in a pivotable portion of the head but possibly in the fixed head portion. The cylinders are provided with wedge-shaped members 35 and 36 which are displaceably mounted on the housing of the cylinders. These wedge-shaped members 35 and 36 engage in conically extending or tapering recesses 37 and 38 respectively, which are formed in lateral portions 39 and 40 of the extruder head. The conical configuration of the recesses in the wedge-shaped members 35 and 36 permits a pressure to be built-up through the intermediary of the head portion 4. This pressure acts in the direction of the pressure surface 18. This pressure urges the pressure surface 18 towards the sealing ring 17 which, in turn, presses the perforated plates 8 towards the second sealing ring 16 and the housing wall 3a and, in consequence, seals it.

When viewed in the direction of flow of the material, therefore, the sealing is effected between the housing wall 3a and the sealing ring 16 as well as between the sealing ring 16 and the perforated plate 8. However, sealing is also achieved between the perforated plate 8 and the sealing ring 17 and the sealing ring 17 and the pressure surface 18.

In order to permit the perforated plates 8 fitted with the filter devices 12 to be displaced at right angles to the direction of flow of the material, and with pressure being exerted upon the pressure surfaces 18 by the locking means, the pressure which the hydraulic cylinders 33 and 34 exert upon the wedge-shaped members 35 and 36 is reduced, for example, from approximately 250 bars to approximately 100 bars without the wedge-shaped members themselves having to be removed from the conically tapering recesses 37 and 38. The latter step occurs only when the head portion 4 is to be raised by means of the hydraulic cylinder 6.

Such a reduction in pressure causes the head portion 4 to exert less pressure upon the pressure surface 18. This causes the material pressure in the flow channel 7, which may be as high as 500 bars if the material being processed is rubber, to displace the perforated plates 8 through a distance of a few μm in the direction of flow of the material.

Due to this change in pressure, the seating of the perforated plates 8 in their guide means is slightly weakened and the perforated plates 8 may then be moved by hydraulic cylinder 14 from the stand-by position 8a into the working position 8b, as shown in FIG. 3. This temporary pressure reduction only slightly impairs the sealing of the perforated plates. After the perforated plates 8 have been displaced, a sealing pressure of approximately 250 bars is built-up again by utilising the hydraulic cylinders 33 and 34.

Figure 4:
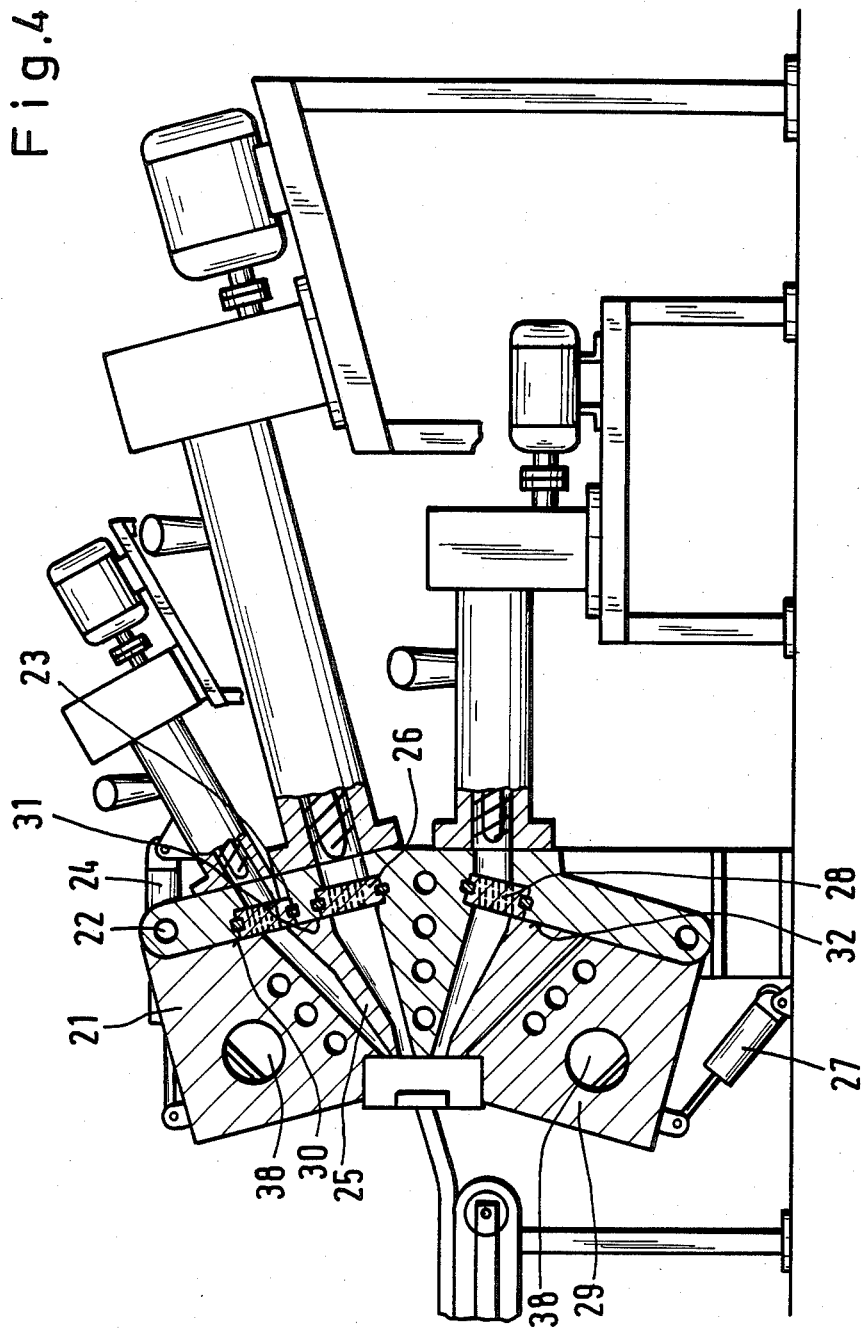
FIG. 4 shows a further embodiment of the sealing mechanism provided on a multiple extrusion head used for producing, for example, tread strips for motor vehicle tyres.

FIG. 4 shows a multiple head extrusion device which is used for producing the tread strip and lateral wall portion of vehicle tyres and which is also provided with a sealing mechanism for the filter changing device.

By pivoting the upper portion 21 of the multiple head about its pivot point 22, the pressure surfaces 30 on the perforated plates 23 are relieved of pressure and the perforated plates 23 can now be displaced at right angles to the direction of flow of the material so that a new fine-mesh filter may be introduced. By relieving the pressure of the hydraulic cylinder 24 from, for example, 250 bars to 100 bars, the compression force is reduced, the displacement movement may be effected and the fine-mesh filters may be interchanged or replaced after the displacement operation has been effected.

In FIG. 4, there is also shown an insert member 25 which is included in the extrusion head in which flow channels are provided for the material. This is also affected by the upper portion 21 of the head, the relief of the pressure of the hydraulic piston and cylinder arrangement 24 also causes the relief of pressure on the perforated plates 26 and/or the pressure surfaces 31. Accordingly the fine-mesh filters which are respectively disposed on each of the perforated plates can be simultaneously replaced once the perforated plates have been displaced by means of a hydraulic piston and cylinder arrangement 14 as is shown in FIG. 3.

This operation also occurs when the hydraulic cylinder 27 in FIG. 4 is relieved of pressure and consequently the pressure surface 32 and the perforated plates 28 are also relieved of pressure so that they can then be moved, as is indicated in FIG. 3 by arrow 15.

In the system shown in FIG. 4, the hydraulic cylinders 24 and 27, which are required for the pivotal movement of the head portions 21 and 29 respectively, are simultaneously used for sealing the filter changing devices.

The locking mechanism shown in FIG. 5 may also be used for the multiple head extrusion device shown in FIG. 4. In FIG. 4, this locking mechanism comprises the conically extending or tapering recesses 38 in which the wedge-shaped members 35 and 36 engage, in the same manner as shown in FIG. 5.

I claim:

1. A sealing mechanism for a filter changing device in an extruder, comprising:
    (a) an extrusion head comprising at least one fixed head portion and at least one displaceable head portion mounted for pivotal movement relative to said fixed head portion,
    (b) means for pivoting said at least one displaceable head portion between an inoperative position wherein said at least one displaceable head portion is remotely spaced from said at least one fixed head portion, and an operative position wherein said at least one displaceable head portion is disposed with respect to said at least one fixed head portion to jointly define flow channel means therebetween,
    (c) filter means disposed in said flow channel means for filtering extruded material exiting said flow channel means,
    (d) holder means for retaining said filter means, said holder means comprising at least two perforated plates and guide means mounting said plates for displacement in a direction substantially at right angles to the direction of flow of said material exiting said flow channel means,
    (e) means for moving said plates in said guide means in said direction to replace one of said perforated plates from the flow path of said material and to position the other of said plates in such path, and wherein
    (f) said displaceable head portion is formed with a pressure surface which in the operative position of said displaceable head portion applies pressure to said plates for preventing the flow of material into said guide means.

2. A sealing mechanism as recited in claim 1, wherein said means for pivoting said at least one displaceable head portion comprises a hydraulic piston and cylinder assembly, the actuation of said assembly effecting both the movement of said at least one displaceable head portion to an operative position and the application of pressure by said pressure surface against said perforated plates.

3. A sealing mechanism as recited in claim 1, wherein said extrusion head further includes side wall portions disposed laterally of said at least one fixed head portion and said at least one pivotable head portion, said side wall portions having recesses formed therein, a pair of wedge-shaped members mounted in said at least one displaceable head portion in alignment with said recesses, and means for moving said wedge-shaped members under pressure laterally outwardly in the direction of said recesses, the engagement of said wedge-shaped members in said recesses simultaneously locking said at least one pivotable head portion against displacement caused by the pressure of said material being extruded thereagainst.

4. A sealing mechanism as recited in claim 3, wherein said means for laterally moving said wedge-shaped members under pressure comprise piston and cylinder assemblies.

5. A sealing mechanism as recited in claim 4, further including means for varying the pressure applied to said piston and cylinder assemblies, a relatively reduced pressure decreasing the pressure applied by said pressure surface against said plates, thereby permitting displaceable lateral movement of said plates.

6. A sealing mechanism as recited in claim 1, further comprising sealing ring means disposed between said pressure surface and said perforated plates, said sealing ring means surrounding said flow channel for said material being extruded.

7. A sealing mechanism as recited in claim 6, further comprising a second sealing ring means disposed on the side of said perforated plates opposite to said first mentioned sealing ring means and between said plates and an adjacent wall of said at least one fixed head portion whereby said perforated plates and said guide means are sealed upstream of said plates.

* * * * *